US012589530B2

(12) United States Patent
Francois et al.

(10) Patent No.: US 12,589,530 B2
(45) Date of Patent: Mar. 31, 2026

(54) VEHICLE INTERIOR PANEL WITH NON-UNIFORM HARDNESS

(71) Applicant: Faurecia Interior Systems, Inc., Auburn Hills, MI (US)

(72) Inventors: Aurelien Francois, Berkley, MI (US); Thomas Bianco, Royal Oak, MI (US); Xavier Toneu, Valencia (ES)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 195 days.

(21) Appl. No.: 18/125,453

(22) Filed: Mar. 23, 2023

(65) Prior Publication Data

US 2024/0316838 A1 Sep. 26, 2024

(51) Int. Cl.
B29C 43/52 (2006.01)
B29C 43/00 (2006.01)
(Continued)

(52) U.S. Cl.
CPC ............ B29C 43/52 (2013.01); B29C 43/006 (2013.01); B29C 43/20 (2013.01); B29C 45/14336 (2013.01); B32B 3/30 (2013.01); B32B 5/022 (2013.01); B32B 5/073 (2021.05); B32B 5/265 (2021.05); B32B 37/08 (2013.01); B32B 37/10 (2013.01); B32B 37/24 (2013.01); B29L 2031/3005 (2013.01); B32B 2038/008 (2013.01); B32B 2262/0253 (2013.01); B32B 2262/062 (2013.01); B32B 2262/065 (2013.01);
(Continued)

(58) Field of Classification Search
CPC ............ A41C 3/0014; B32B 2037/243; B32B 2038/008; B32B 2250/02; B32B 2250/20; B32B 2255/02; B32B 2255/26; B32B 2305/18; B32B 2437/00; B32B 2535/00; B32B 37/24; B32B 38/0004; B32B 5/073
See application file for complete search history.

(56) References Cited

U.S. PATENT DOCUMENTS 8,075,971 B1 * 12/2011 Horian .................... B32B 5/022
428/61
10,926,732 B2 2/2021 Sterne Stroebe et al.
(Continued)

FOREIGN PATENT DOCUMENTS

CN 103240890 A 8/2013
CN 110494608 A * 11/2019 ............... B32B 5/06
(Continued)

OTHER PUBLICATIONS

Translation of CN109068777.*
(Continued)

*Primary Examiner* — Sonya M Sengupta
(74) *Attorney, Agent, or Firm* — Reising Ethington P.C.

(57) ABSTRACT

A vehicle interior panel includes a substrate with non-uniform hardness, providing cushioned portions of the panel without the need for a distinct cushioning layer. The substrate is made from a mat of natural and synthetic fibers that is heated and pressed so that the pressed mat has thick and thin portions. The thin portions are rigid and structural, and the thick portions are soft. Application of a decorative layer can be incorporated into the process, as can back-injection molding (BIM) for additional structure.

20 Claims, 4 Drawing Sheets

(51) Int. Cl.

| | |
|---|---|
| *B29C 43/20* | (2006.01) |
| *B29C 45/14* | (2006.01) |
| *B29L 31/30* | (2006.01) |
| *B32B 3/30* | (2006.01) |
| *B32B 5/02* | (2006.01) |
| *B32B 5/06* | (2006.01) |
| *B32B 5/26* | (2006.01) |
| *B32B 37/08* | (2006.01) |
| *B32B 37/10* | (2006.01) |
| *B32B 37/24* | (2006.01) |
| *B32B 38/00* | (2006.01) |

(52) U.S. Cl.
CPC ..... *B32B 2262/067* (2013.01); *B32B 2262/08* (2013.01); *B32B 2262/144* (2021.05); *B32B 2305/28* (2013.01); *B32B 2317/10* (2013.01); *B32B 2317/16* (2013.01); *B32B 2323/10* (2013.01); *B32B 2605/003* (2013.01)

(56) References Cited

U.S. PATENT DOCUMENTS

| | | | | |
|---|---|---|---|---|
| 2004/0247821 A1* | 12/2004 | Zafiroglu | ............. | D06M 17/04 428/95 |
| 2006/0254855 A1 | 11/2006 | Loftus et al. | | |

| | | | | |
|---|---|---|---|---|
| 2015/0197069 A1 | 7/2015 | Basquin et al. | | |
| 2016/0312389 A1* | 10/2016 | Jang | .......................... | B32B 7/12 |
| 2017/0106571 A1 | 4/2017 | Galen | | |
| 2017/0157903 A1* | 6/2017 | Huang | ..................... | B32B 7/14 |
| 2018/0079372 A1 | 3/2018 | Iwasaki et al. | | |
| 2019/0255747 A1 | 8/2019 | Pignard | | |
| 2021/0237323 A1 | 8/2021 | Gassman et al. | | |
| 2025/0057259 A1* | 2/2025 | Bauer | ..................... | B32B 7/14 |

FOREIGN PATENT DOCUMENTS

| | | | |
|---|---|---|---|
| DE | 102017121661 A1 | 3/2018 | |
| EP | 3527432 A1 | 8/2019 | |
| EP | 3804979 A1 | 4/2021 | |
| GB | 843154 A | 8/1960 | |
| JP | 2006123198 A | 5/2006 | |
| WO | 2010080967 A1 | 7/2010 | |
| WO | 2017053313 A1 | 3/2017 | |

OTHER PUBLICATIONS

Translation of CN103240890.*
Search Report for EP24165120.7.*
European Search Report corresponding to application 24165120.7, dated Jul. 26, 2024, 8 pages.

* cited by examiner

VEHICLE INTERIOR PANEL WITH NON-UNIFORM HARDNESS

TECHNICAL FIELD

The present disclosure is related generally to vehicle interior panels and, more particularly, to vehicle interior panels made with materials including natural fibers.

BACKGROUND

Attempts have been made to use natural fibers as the reinforcing component in polymer composites since the advent of such composites, but problems with their implementation led to non-organic reinforcements such as glass fibers or mineral fillers dominating the market for decades. In recent years, manufacturers have a renewed interest in natural fiber-based composites as some strive to achieve a net-zero carbon footprint in the near future. Some great strides have been made in the automotive industry and its supply base, but challenges remain.

U.S. Patent Application Publication No. 2015/0197069 by Basquin, et al. offers one example of a leading automotive interiors manufacturer advancing the art of natural fiber-reinforced composites. Basquin discloses a method of making a carrier or backing for a vehicle interior panel by hot-pressing mixtures of thermoplastic fibers and natural fibers down to a thickness below 1.0 millimeter, while conventional injection molded polymer composites have a 2.5 mm to 3.0 mm thickness range. However, Basquin does not address another problem related to upholstering such a carrier in a manner that is aesthetically pleasing to consumers, which normally requires a soft foam layer and a decorative skin layer over the panel.

SUMMARY

In accordance with one or more embodiments, a method of manufacturing a vehicle interior panel includes pressing a fiber mat between heated first and second tool portions to form a hot mat, and pressing the hot mat between cooled first and second tool portions to form a compression-formed panel. The fiber mat includes natural fibers and thermoplastic fibers. The hot mat has a first portion with a first thickness and a second portion with a second thickness that is less than the first thickness. A spacing between the cooled first and second tool portions is greater at the first portion of the hot mat than at the second portion of the hot mat. The compression-formed panel has a soft portion corresponding to the first portion of the hot mat and a hard portion corresponding to the second portion of the hot mat.

In various embodiments, the fiber mat has an initial thickness, and the first thickness is in a range from 20% to 100% of the initial thickness.

In various embodiments, the fiber mat has an initial thickness, and the second thickness is in a range from 10% to 40% of the initial thickness.

In various embodiments, the compression-formed panel is a substrate of the vehicle interior panel, and the method additionally includes the step of attaching a decorative layer along a side of the substrate that faces an interior of a vehicle when the vehicle interior panel is installed in the vehicle.

In various embodiments, the decorative layer is in contact with the hot mat during the step of pressing the hot mat and is thereby adhered to the substrate.

In various embodiments, the decorative layer does not include a compressible backing layer, and the vehicle interior panel has a cushioned portion provided by the soft portion of the substrate.

In various embodiments, the method additionally includes the step of sewing through the decorative layer and the substrate to form a line of stitching along a boundary between the soft portion and hard portion.

In various embodiments, the method additionally includes the step of sewing through the decorative layer and the substrate to form a line of stitching through the soft portion.

In various embodiments, the decorative layer comprises natural fibers and thermoplastic fibers.

In various embodiments, the thermoplastic fibers of the fiber mat and the thermoplastic fibers of the decorative layer each comprise polyolefin fibers.

In various embodiments, the method additionally includes the step of overmolding a rib structure onto the compression-formed panel via injection molding.

In various embodiments, the step of overmolding is performed during the step of pressing the hot mat.

In various embodiments, the method additionally includes the step of treating the soft portion of the compression-formed panel to prevent microbial or water ingress.

It is contemplated that any number of the individual features of the above-described embodiments and of any other embodiments reflected in the claims, drawings, or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel with a cushioned portion provided by the same piece of material as the panel substrate. The panel substrate has a non-uniform hardness with relatively hard and soft portions and is formed by controlling the amount of compression along a fiber mat used to form the panel substrate. The fiber mat may include a mixture of natural fibers and synthetic fibers as part of a movement toward carbon-neutral manufacturing.

Figure 1:
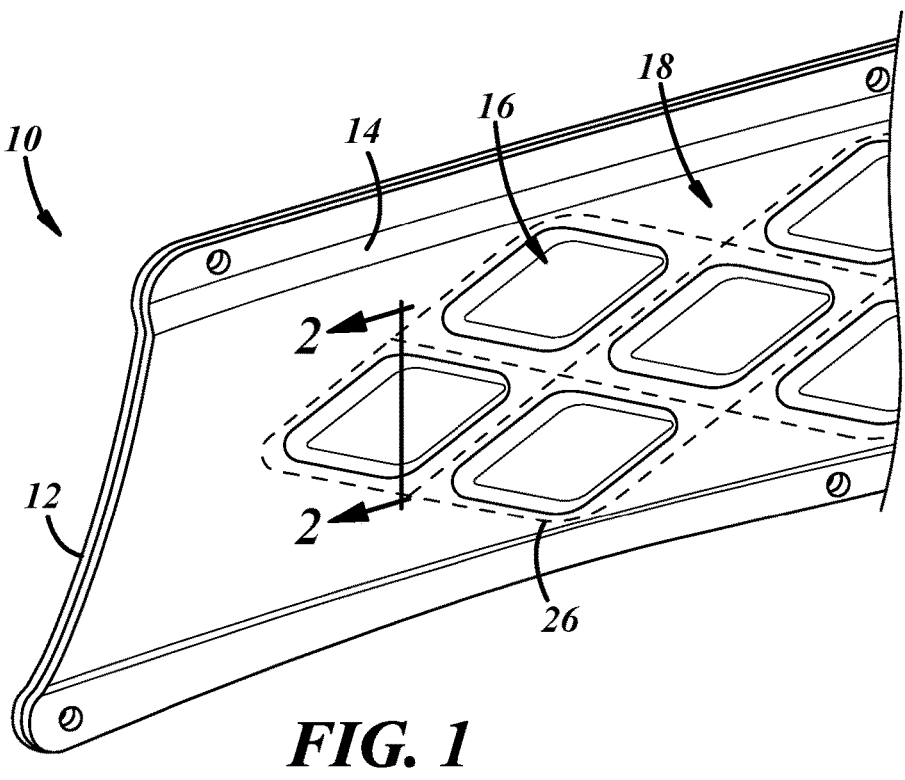
FIG. 1 is a perspective view of a portion of vehicle interior panel having a substrate with non-uniform hardness.
Figure 2:
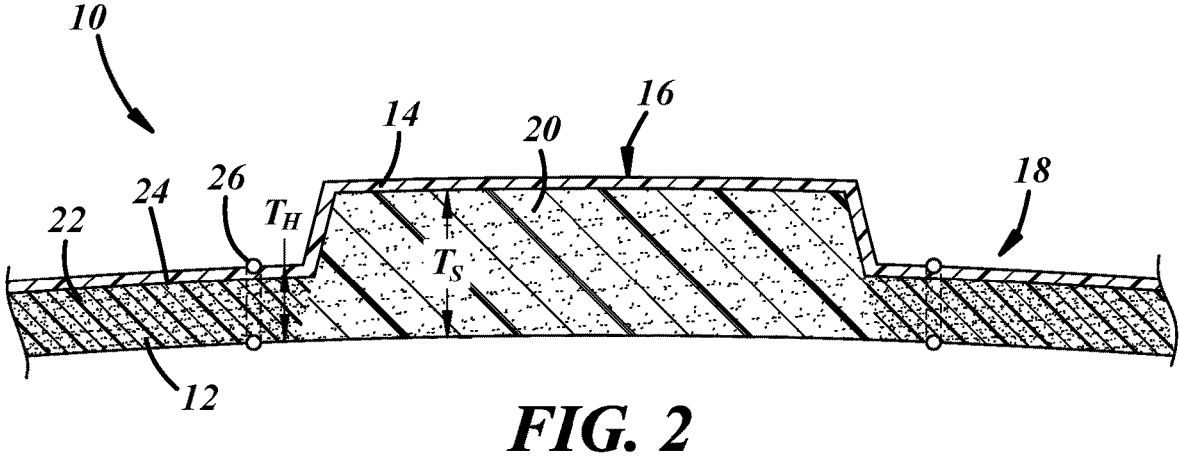
FIG. 2 is a cross-sectional view of the panel of FIG. 1.

FIG. 1 is a perspective view of a portion of an embodiment of a vehicle interior panel 10, and FIG. 2 is a cross-sectional view of the panel of FIG. 1. The illustrated panel 10 is an insert panel or sub-panel that is a subcomponent of a larger vehicle interior panel, such as an interior door panel. However, the methods and structures described below can be applied to any vehicle interior panel, such as an instrument panel, console panel, seat panel, or roof panel, to name a few examples. The panel 10 includes a substrate 12 and a decorative layer 14 disposed over and/or attached to the substrate. The panel 10 has one or more cushioned portions 16 and uncushioned portions 18. "Cushioned" is used here in the sense of upholstery. This means that, when a manual force is applied against the outermost decorative surface of a cushioned portion 16, the panel 10 locally and elastically compresses and then returns to its original shape when the force is removed.

As referenced above, conventional vehicle interior panels typically employ a three-layer construction with a cushioning layer sandwiched between a decorative outer layer and a rigid or semi-rigid substrate. The illustrated panel 10 employs a substrate 12 with non-uniform hardness and can thus provide cushioning without the need for a distinct cushioning layer. The substrate 12 is of unitary construction and includes one or more soft portions 20 and hard portions 22, where the soft portions 20 of the substrate 12 correspond to the cushioned portions 16 of the panel 10 and the hard portions 22 of the substrate 12 correspond to the uncushioned portions 18 of the panel 10. "Unitary construction" means the substrate 12 is formed as a single, continuous piece from the same material—i.e., without joining separately formed pieces together. "Soft" and "hard" are relative terms—i.e., a hard portion is harder than a soft portion. Also, "hard" and "soft" may alternatively be considered respectively as more or less stiff in bending or as having a higher or lower modulus of elasticity.

As discussed further below, embodiments of the panel 10 include a substrate 12 formed from a fiber mat having an initial and generally uniform thickness. The substrate 12 of the finished panel 10 has more than one different thickness. In the example of FIG. 2, the soft portion 20 of the substrate 12 has a thickness $T_S$ that is greater than a thickness $T_H$ of the hard portion 22. Additionally, the density of the soft portion 20 may be less than the density of the hard portion 22. Generally, the density of the substrate material is inversely proportional to its thickness. As shown in the figures, the cushioned portions 16 of the panel 10 may protrude outwardly with respect to adjacent uncushioned portions and be visibly discernible as aesthetic elements of the panel. There may be intermediate substrate thicknesses along the panel between $T_S$ and $T_H$, along with corresponding densities and degrees of cushioning—where larger thickness and lower density correspond to greater degrees of cushioning.

Figures 3A, 3B, 3C, 3D, 3E:
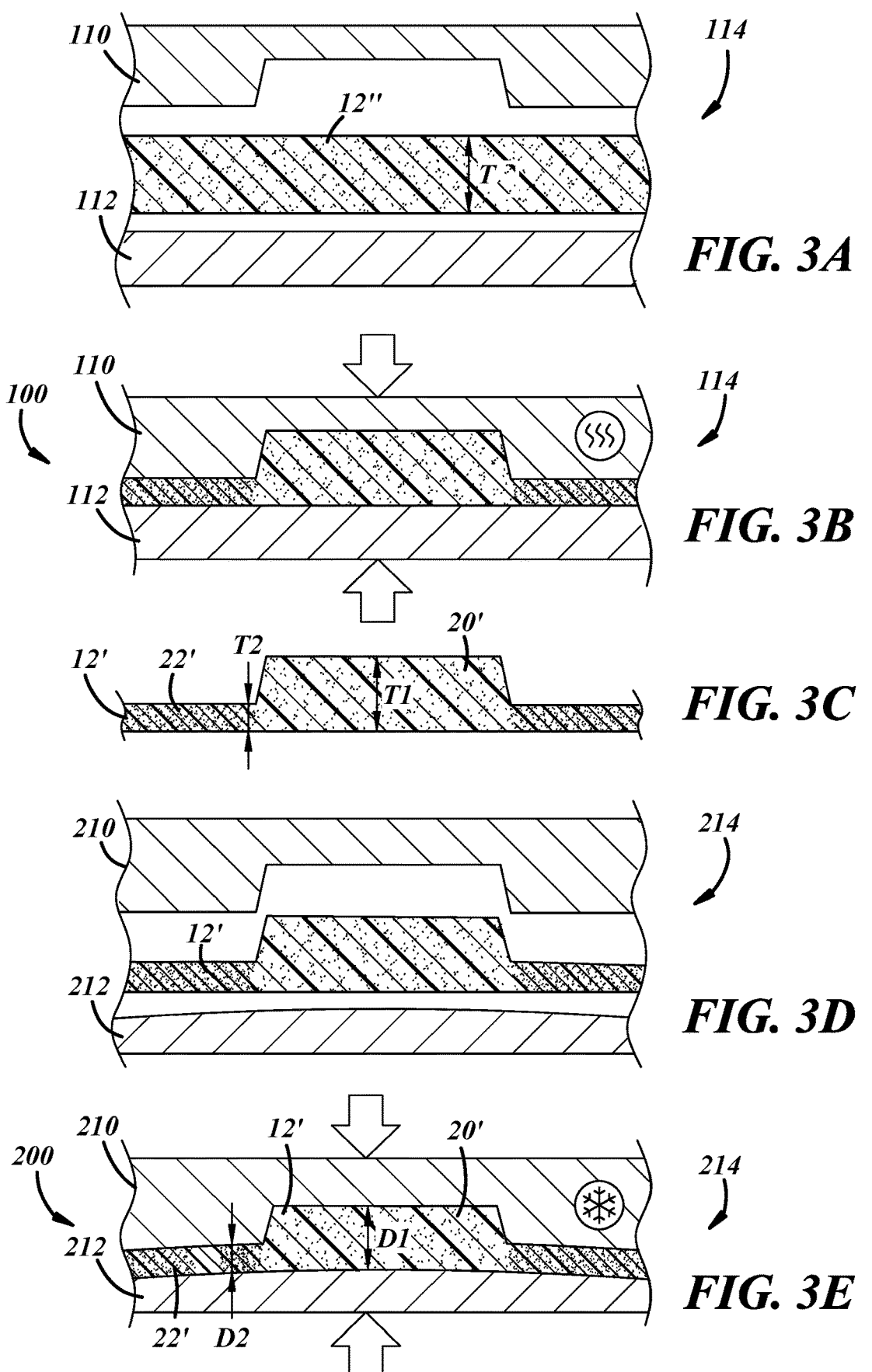
FIGS. 3A-3E are cross-sectional views of a fiber mat during an exemplary method of making the interior panel of FIG. 1.
Figures 4A, 4B, 4C, 4D, 4E:
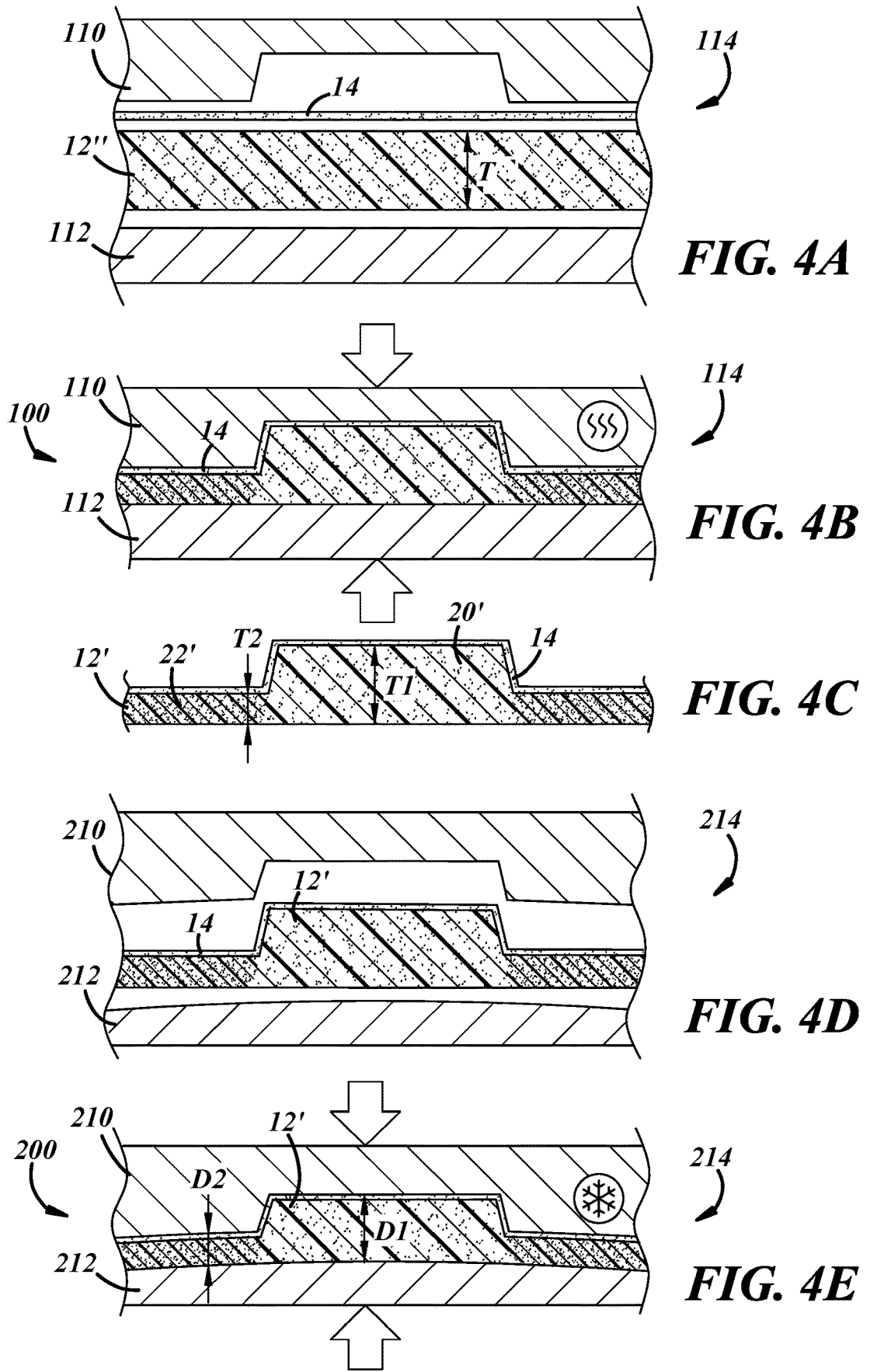
FIGS. 4A-4E are cross-sectional views of a fiber mat and a decorative layer during an exemplary method of making the interior panel of FIG. 1.

With reference to FIGS. 3A-3E, an exemplary method of making a vehicle interior panel such as the panel 10 of FIGS. 1 and 2 includes sequential first and second pressing steps 100, 200. Only a portion of the mats, tools, and panels are shown in the figures in order to show enlarged views. Prior to the first pressing step 100 of this example, a fiber mat 12" is located between first and second portions 110, 112 of a first compression tool 114 as illustrated in FIG. 3A. The first compression tool 114 may be a hot pressing tool in that one or both of the first and second portions 110, 112 are heated tool portions configured to heat the fiber mat 12" when the fiber mat is pressed between the tool portions 110, 112. Alternatively, the heating and pressing can be performed in separate sequential steps and/or using separate tools or fixturing.

The fiber mat 12" is a non-woven component composed of a thermoplastic component and a plurality of entangled fibers. The thermoplastic component may be one of the types of entangled fibers. The fibers may include thermoplastic fibers and/or natural fibers. Suitable natural fibers include but are not limited to hemp, jute, sisal, flax, wool, cotton, wood, and bamboo, to name a few. Suitable thermoplastic fibers include but are not limited to polyolefin fibers, such as polypropylene and its copolymers. The thermoplastic component may be in some other form, such as powder. In some embodiments, the fiber mat 12" is formed from a mixture of individualized natural fibers and thermoplastic fibers in a ratio from 25:75 to 75:25 by weight natural fibers to thermoplastic fibers. In another embodiment, the ratio is in a range from 40:60 to 60:40 or 50:50, within normal manufacturing tolerances. Other types of fibers (e.g., glass, carbon, etc.) are not excluded from use in the mat.

The fiber mat 12" has a soft, fluffy character with its bulk volume being largely air in its initial form. The fiber mat 12" may be formed using methods known in the textile industry such as combing and/or needlepunching the desired types of fibers together to form the mat. The fiber mat 12" has a generally uniform initial thickness T which may be in a range from 10 mm to 20 mm, 10 mm to 15 mm, or 10 mm to 12 mm. As used here, "uniform" means within normal manufacturing tolerances for fiber mats, which may be +20% of the nominal thickness.

In FIG. 3B, the heated tool portions 110, 112 are brought together to heat and at least partially compress the fiber mat 12". The hot pressing tool 114 is configured to produce a hot mat or pre-form 12' (FIG. 3C) having at least two different thicknesses T1 and T2. The tool portions 110, 112 are maintained at a temperature sufficient to soften and/or melt a thermoplastic component (e.g., polypropylene fibers) of the fiber mat 12" such that the mixture of fibers in the mat adhere with one another. The thermoplastic fibers may thus act as a hot melt adhesive that joins the other fibers together, with the hot pressing step melting the adhesive and pressing the other fibers into the molten adhesive.

A first portion 20' of the hot mat 12' has a thickness T1 that is greater than a thickness T2 of a second portion 22' of the hot mat, with the first and second portions 20', 22' corresponding to the respective soft and hard portions 20, 22 of the substrate 12 of FIG. 2. The first thickness T1 is less than or equal to the initial thickness T of the fiber mat 12" (T1≤T), and the second thickness T2 is less than T1 (T2<T1). In one embodiment, the first thickness T1 is in a range from 20% to 100% of the initial thickness. Preferably, the first thickness T1 is maintained closer to the initial thickness to maximize the cushioning effect in the finished panel. Exemplary ranges for T1 include 50% to 100%, 75% to 100%, and 90% to 100% of the initial thickness T. The high end of any of these ranges may be less than 100% to ensure the tool contacts the fiber mat 12" and to help remove thickness variations in the as-received fiber mat 12".

The second portion 22' of the hot mat 12' has a thickness T2 that is less than the initial thickness T and less than the thickness T1 of the first portion 20' of the hot mat. In one embodiment, the second thickness T2 is in a range from 10% to 40% of the initial thickness T. In another embodiment, the second thickness T2 is in a range from 15% to 30% of the initial thickness T. Generally, the hot pressing step 100 reduces the initial thickness T of the fiber mat 12" to within 10-50% of the final thicknesses $T_S$, $T_H$ of the panel substrate 12 of FIG. 2 with some room left for final thickness reductions in the second pressing step 200. In one example, the initial thickness T of the fiber mat 12" is in a range from 10 mm to 12 mm, the first thickness T1 of the hot mat 12' is in a range from 10 mm to 12 mm (i.e., effectively uncompressed), and the second thickness T2 of the hot mat is in a range from 2 mm to 3 mm.

In preparation for the second pressing step 200, the hot mat 12" is disposed between first and second portions 210, 212 of a second compression tool 214 as illustrated in FIG.

3D. The second compression tool 214 may be a molding tool in that a material comprising molten material (i.e., melted fibers in the hot mat 12'), is introduced, formed to shape, and cooled in the tool 214 to retain that shape. While the primary purpose of the first compression tool 114 is to heat the fiber mat 12" and bring it close to its final thickness, the primary purpose of the second compression tool 214 is to bring the mat to its final shape and thickness and to cool the material to solidify the shape. While the first pressing step changes the thickness profile of the fiber mat 12", the hot mat 12' that is produced remains generally flat with parallel opposite surfaces. At least the second portion 22' having the greater thickness reduction is flat in the illustrated example. The elapsed time between removal of the hot mat 12' from the hot pressing tool 114 to the molding tool 214 should be minimized to ensure that the thermoplastic component(s) of the hot mat remain molten at the beginning of the second pressing step 200.

In FIG. 3D, the cooled tool portions 210, 212 are brought together to shape and cool the hot mat or pre-form 12'. The cold pressing tool 214 is configured to produce a compression-formed panel 12 which can be used as the substrate of a vehicle interior panel as in FIGS. 1 and 2. The second pressing step 200 thus introduces contours to the mat-particularly to the portions 22' of the mat that will become the hard or rigid portions 22 that define the overall shape of the finished interior panel 10. The tool portions 210, 212 are maintained at a temperature sufficient to harden the molten thermoplastic component of the hot mat 12' such that the other fibers in the mat are adhered together in a final shape.

The molding tool 214 is configured such that, when the tool is closed on the hot mat 12', a spacing D1 between the between the cooled first and second tool portions 210, 212 is greater at the first portion 20' of the hot mat than a spacing D2 at the second portion 22' of the hot mat. This is to accommodate the greater local thickness T1 of the hot mat to maintain its lower density and softness through the second pressing step 200. The hot mat 12' must therefore be carefully aligned and registered with the molding tool 214 so that the thicker portion 20' is co-located with a mold feature (i.e., the recess in the mold portion 210) in order to obtain the compression-formed panel with non-uniform hardness.

One of ordinary skill in the art would undoubtedly consider such a requirement to align the sheet material with the molding tool to be a disadvantage, because it adds complexity or steps to the manufacturing process. Indeed, conventional compression molding (e.g., thermoforming) requires almost no alignment between the sheet material and the compression mold, so long as the sheet material extends across the entire mold cavity. Nonetheless, the present inventors proceeded in the face of such known disadvantages and have realized the benefit of a compression formed panel with non-uniform hardness that can be used in a vehicle interior panel to reduce the number of components used to make one. A useful property of the fiber mat 12" is also preserved rather than being fully compressed into a rigid material, as is conventional.

The second compression step 200 thus produces the substrate 12 of a vehicle interior panel as a compression-formed panel having a non-uniform hardness as a result of controlling part thickness and degree of compression during its transformation from a fiber mat 12". In the illustrated examples, the tool spacing D1 is equivalent to the thickness $T_S$ of the soft portion 20 of the substrate 12, and the tool spacing D2 is equivalent to the thickness $T_H$ of the hard portion 22 of the substrate. Tool spacing and final part thickness may not be exactly the same to account for dimensional changes (e.g., shrinkage) after demolding. However, D1 may be less than T1, and D2 may be less than T2 to ensure the final desired part thickness is reached. In one example, the thickness T1 of the first portion 20' of the hot mat 12' is maintained during the second pressing step 200 such that $T1 \approx T_S$. The thickness $T_H$ of the hard portion 22 of the formed panel may be in a range from 50% to 90% of the thickness T2 of the corresponding portion 22' of the hot mat. In a dimensional example, the thickness T2 of the hot mat 12' is in a range from 2 mm to 3 mm, and the thickness $T_H$ of the hard portion of the substrate 12 is nominally 2 mm.

With reference again to FIGS. 1 and 2, the decorative layer 14 may be disposed over and attached to the formed substrate 12 by any suitable means, such as adhesive bonding, thermal bonding, and/or panel wrapping techniques known in the art. The decorative layer 14 may be leather, imitation leather, a polymeric film, fabric, or other desirable material and is arranged over a front side 24 of the substrate 12, which is the side of the substrate that faces the interior of the vehicle in which the panel 10 is installed. Advantageously, embodiments of the panel 10 do not include a compressible backing layer (e.g., foam or spacer fabric) between the substrate 12 and decorative layer 14, and the decorative layer does not include an integrated compressible backing layer (e.g., bi-layer decorative covering). Stated differently, there is no foam or spacer fabric between the compression-formed material and the visible skin layer of the panel. Of course, where desired, additional compressible layers may be employed.

The example of FIGS. 1 and 2 also includes a line of stitching 26 formed through the substrate 12 and decorative layer 14. The line of stitching 26 may be provided for decorative purposes, by simulating a piece-and-sew construction or providing a quilted look. The line of stitching 26 can also provide some utility. For example, a wrap-attached decorative layer 14 may tend to flatten the locally thick and soft portions 20 of the substrate 12 such that they lose definition in the finished panel. The line of stitching 26 can function to locally pull the decorative layer 14 closer to the hard portions 22 of the substrate to allow the cushioned portions 16 of the panel to be more prominent when the stitching is provided along a boundary between the hard and soft portions. In another example, a line of stitching 26 may be sewn through the decorative layer 14 and the soft portion 20 of the substrate 12 to produce a quilted effect.

In other examples, the decorative layer 14 is applied as an integral part of the above-described fiber mat forming process. The decorative layer 14 may for example be present and in contact with the hot mat 12' during the first and/or second pressing steps 100, 200 as in the example of FIGS. 4A-4E. Here, the decorative layer 14 is included in the first pressing step 100 and is thus heated and deformed to take the shape of the surface of the hot mat 12' in the first pressing step 100 and is molded along with the hot mat 12' in the second pressing step 200 to form a panel 10 including both the substrate 12 and decorative layer in an adhesiveless process. Polymer film decorative layers (e.g., simulated leather) are particularly suitable for this in-mold application of the decorative layer. In other embodiments, the decorative layer 14 is a fabric layer. The fabric layer may be a non-woven fabric layer and, like the fiber mat and resulting panel substrate, may include or be formed from natural fibers and/or thermoplastic fibers. Suitable natural fiber-based fabrics are available under the tradenames Amplitex®, EcoRein, and FlaxDry. Such decorative layers both reduce the carbon footprint of the vehicle interior panel 10 and make it easier to recycle, particularly where the thermoplastic fibers (e.g., polyolefin) and the natural fibers (e.g., flax) are the same or similar in both the substrate 12 and the decorative layer 14.

Figure 5:
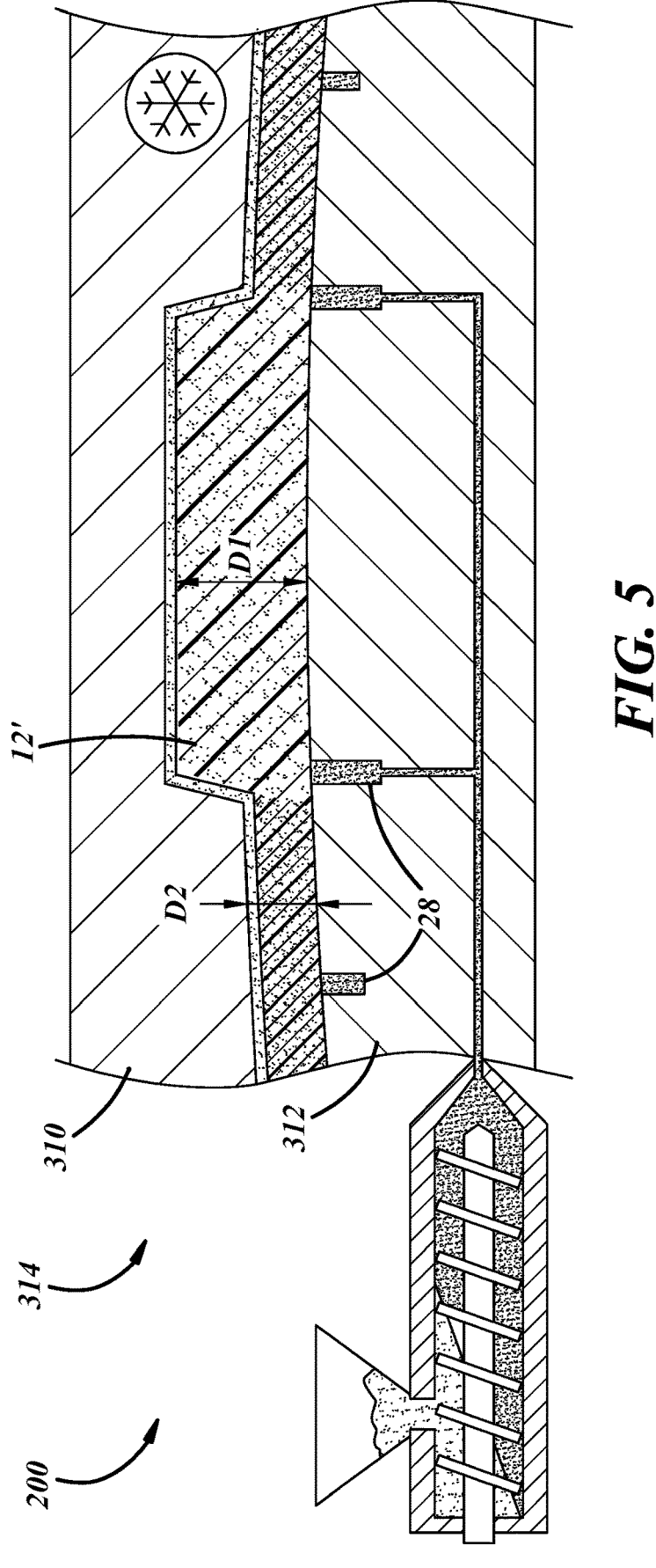
FIG. 5 is a schematic cross-sectional view of an alternative step in the method of FIGS. 4A-4E.

FIG. 5 schematically illustrates a variation of the disclosed method in which panel stiffening features such as a rib structure 28 are overmolded onto the substrate during the second pressing step 200. Here, the molding tool 314 is an injection molding tool and one of the mold portions 312 uses a hot runner system to distribute plastic material to one side of the formed mat/panel to form the rib structure 28. The rib structure 28 is formed on a back side of the panel, which is opposite the front side 24 (FIG. 2) and is a non-decorative side. This process may be referred to as back injection molding (BIM) and, in this context, represents a solution to a problem created by the innovation of the non-uniform hardness of the substrate. While the inventors have realized some unexpected advantage to a substrate having non-uniform hardness, it came with new problems to solve. One such problem is the lack of a rigid substrate behind the cushioned portion of the panel. In a typical three-layer construction, the substrate provides the rigidity. But where the substrate provides the cushioning material as in the above examples, the regions of the panel where the cushioned portions 16 are located may lack structural integrity. The BIM structure can provide the missing structural integrity, and it can do so with less material than a solid wall of rigid substrate material.

In the illustrated example, the BIM process is performed together with in-mold formation of the decorative layer 14, further reducing the number of distinct process steps and pieces of required manufacturing equipment. In other examples, the overmolding step may be performed on an already formed substrate in a separate operation, or the overmolding step may be performed during the second pressing step 200 but without the decorative layer 14 being present.

Another by-product of the multi-hardness panel substrate 12 is in relation to ingress of the atmosphere. The hard or rigid portions 22 of the formed substrate 12 are relatively impervious to water, for example, due to their relatively high density (e.g., 0.8 g/cm³ or higher) and their hydrophobic material content, such as polypropylene. The natural fibers of the fiber mat 12″ may also be processed or pre-treated to increase their hydrophobicity. However, the low density of the soft portions 20 of the substrate 12 can having a wicking effect on moisture in any case, which can also lead to concerns with microbial growth, given the natural fiber content. In some embodiments, the substrate 12 is treated to prevent microbial or water ingress. This treatment may include application of a water-impermeable film (e.g., polypropylene) over the back side of the substrate 12. Such a film can be conveniently applied during the above-described compression forming processes. Alternatively, a waterproof coating and/or anti-microbial treatment can be applied to the substrate 12 or panel after formation.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of manufacturing a vehicle interior panel, the method comprising the steps of:
   (a) pressing a fiber mat comprising natural fibers and thermoplastic fibers between heated first and second tool portions to form a hot mat having a first portion with a first thickness and a second portion with a second thickness that is less than the first thickness; and
   (b) pressing the hot mat between cooled first and second tool portions to form a compression-formed panel, wherein a spacing between the cooled first and second tool portions is greater at the first portion of the hot mat than at the second portion of the hot mat,
   the method further comprising the step of overmolding a rib structure onto the compression-formed panel via injection molding,
   whereby the compression-formed panel has a soft portion corresponding to the first portion of the hot mat and a hard portion corresponding to the second portion of the hot mat,
   wherein, before step (a), the fiber mat is flat and has a uniform initial thickness.

2. The method of claim 1, wherein, after step (a), the first thickness is in a range from 20% to 100% of the initial thickness.

3. The method of claim 1, wherein the compression-formed panel is a substrate of the vehicle interior panel, the method further comprising the step of attaching a decorative layer along a side of the substrate that faces an interior of a vehicle when the vehicle interior panel is installed in the vehicle.

4. The method of claim 3, wherein the decorative layer is in contact with the hot mat during step (b) and thereby adhered to the substrate.

5. The method of claim 3, wherein the decorative layer does not include a compressible backing layer, the vehicle interior panel having a cushioned portion provided by the soft portion of the substrate.

6. The method of claim 3, further comprising the step of sewing through the decorative layer and the substrate to form a line of stitching along a boundary between the soft portion and hard portion.

7. The method of claim 3, further comprising the step of sewing through the decorative layer and the substrate to form a line of stitching through the soft portion.

8. The method of claim 3, wherein the decorative layer comprises natural fibers and thermoplastic fibers.

9. The method of claim 1, wherein after step (a), the second thickness is in a range from 10% to 40% of the initial thickness.

10. The method of claim 3, wherein thermoplastic fibers of the fiber mat and thermoplastic fibers of the decorative layer each comprise polyolefin fibers.

11. The method of claim 1, wherein the step of overmolding is performed during step (b).

12. The method of claim 9, wherein the compression-formed panel is a substrate of the vehicle interior panel, the method further comprising the step of attaching a decorative layer along a side of the substrate that faces an interior of a vehicle when the vehicle interior panel is installed in the vehicle.

13. The method of claim 12, wherein the decorative layer is in contact with the hot mat during step (b) and thereby adhered to the substrate.

14. The method of claim 1, further comprising the step of treating the soft portion of the compression-formed panel to prevent microbial or water ingress.

15. A method of manufacturing a vehicle interior panel, the method comprising the steps of:

(a) pressing a fiber mat comprising natural fibers and thermoplastic fibers between heated first and second tool portions to form a hot mat having a first portion with a first thickness and a second portion with a second thickness that is less than the first thickness; and (b) pressing the hot mat between cooled first and second tool portions to form a compression-formed panel, wherein a spacing between the cooled first and second tool portions is greater at the first portion of the hot mat than at the second portion of the hot mat, whereby the compression-formed panel has a soft portion corresponding to the first portion of the hot mat and a hard portion corresponding to the second portion of the hot mat, the method further comprising the step of overmolding a rib structure onto the compression-formed panel via injection molding.

16. The method of claim 15, further comprising attaching a decorative layer to the compression-formed panel, wherein the decorative layer is in contact with the hot mat during step (b) and thereby adhered to the compression-formed panel.

17. The method of claim 15, further comprising attaching a decorative layer to the compression-formed panel and sewing through the decorative layer and the compression-formed panel to form a line of stitching along a boundary between the soft portion and hard portion.

18. The method of claim 15, further comprising attaching a decorative layer to the compression-formed panel and sewing through the decorative layer and the compression-formed panel to form a line of stitching through the soft portion.

19. The method of claim 15, wherein the step of overmolding is performed during step (b).

20. The method of claim 15, further comprising attaching a decorative layer to the compression-formed panel, wherein the decorative layer comprises natural fibers that are the same as the natural fibers of the fiber mat or thermoplastic fibers that are the same as the thermoplastic fibers of the fiber mat.

* * * * *